Sept. 1, 1925.                                                                1,551,938
D. R. CLARK
OILING DEVICE FOR AUTOMOBILE ENGINES
Filed July 21, 1923                    2 Sheets-Sheet 1

Witness:
J. J. Oberst

Inventor:
Donald R. Clark,
By Emil Kenlark
Attorney.

Sept. 1, 1925.
D. R. CLARK
1,551,938
OILING DEVICE FOR AUTOMOBILE ENGINES
Filed July 21, 1923   2 Sheets-Sheet 2
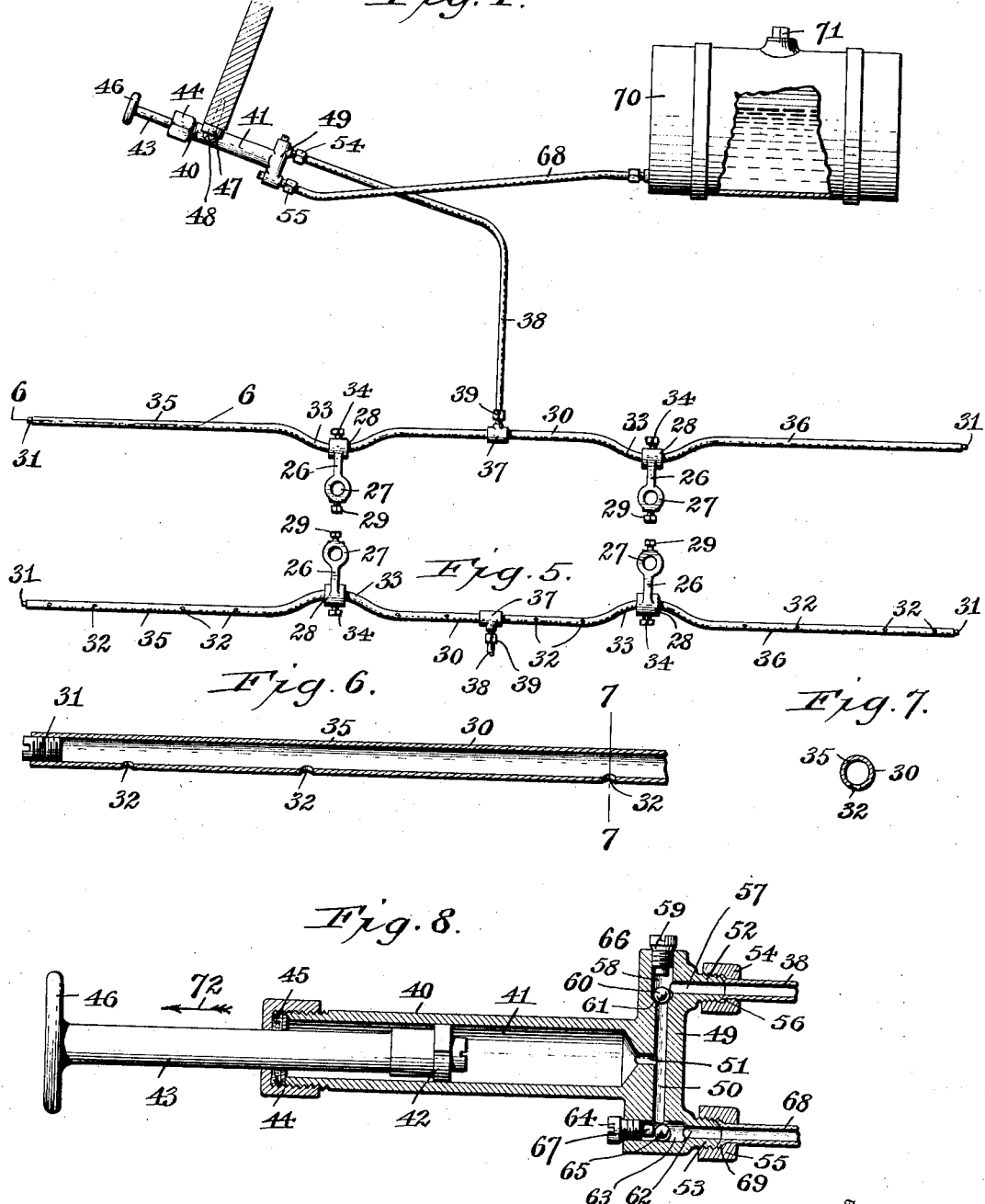
Inventor:
Donald R. Clark,
By Emil Kuehart,
Attorney.
Witness:
J. J. Oberst.

Patented Sept. 1, 1925.

1,551,938

UNITED STATES PATENT OFFICE.

DONALD R. CLARK, OF BUFFALO, NEW YORK.

OILING DEVICE FOR AUTOMOBILE ENGINES.

Application filed July 21, 1923. Serial No. 652,883.

*To all whom it may concern:*

Be it known that I, DONALD R. CLARK, a citizen of the United States, residing at Buffalo, in the county of Erie and State of New York, have invented certain new and useful Improvements in Oiling Devices for Automobile Engines, of which the following is a specification.

My invention relates to improvements in oiling devices for engines of automobiles, and more particularly for oiling overhead valves of automobile engines.

One of the objects of my invention is to provide a simple and inexpensive oiling device which can be attached to any type of engine having overhead valves, for oiling the latter.

Another object is to provide a device capable of being operated for oiling overhead valves of automobiles while the automobile is in motion.

A still further object is to provide an oiling device which is retained underneath the hood of an automobile and has an operating element extending inwardly through the instrument board of the automobile so that the oil can be fed from the device before the automobile is started, after the automobile is stopped, or during the time that the automobile is in motion.

With the above and other objects in view, the invention consists in the novel features of construction and in the arrangement and combination of parts to be hereinafter described and more particularly pointed out in the subjoined claims.

In the drawings:—

Fig. 4 is an elevation of the device on a somewhat enlarged scale, showing the oil-drip tube in plan view.

Fig. 5 is a bottom view of the oil-drip tube.

Fig. 6 is an enlarged section taken on line 6—6, Fig. 4.

Fig. 7 is a transverse section taken on line 7—7, Fig. 6.

Fig. 8 is a central longitudinal section through the oil pump forming part of my improved oiling device.

Figure 1:
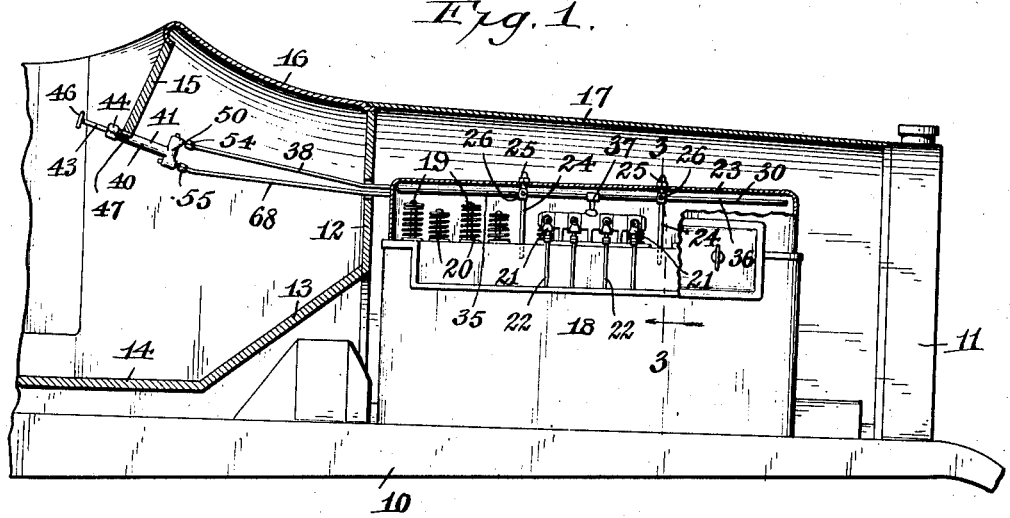
Fig. 1 is a longitudinal section through the front end of an automobile showing my improved invention applied thereto.
Figure 2:
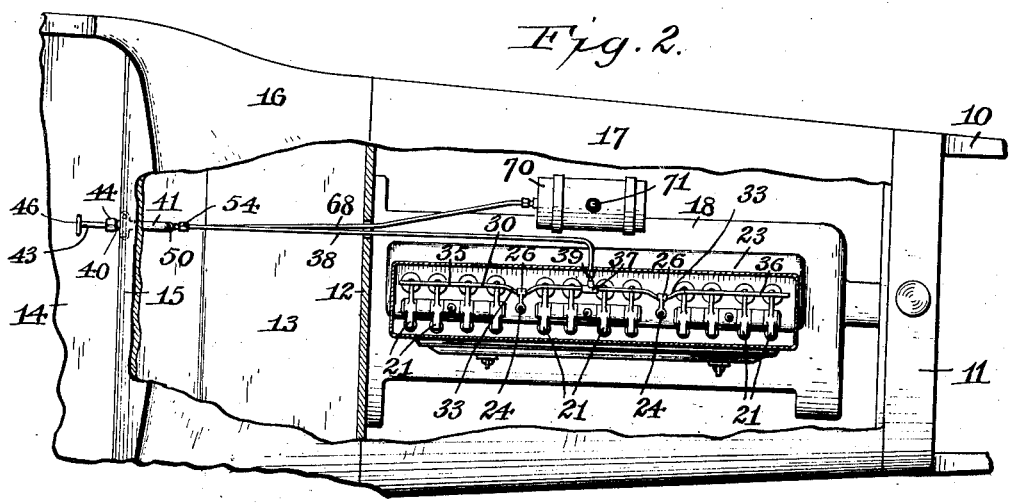
Fig. 2 is a plan view of the front end of an automobile showing a portion of the hood and adjacent parts broken away to illustrate the application of my invention to the engine and instrument board.
Figure 3:
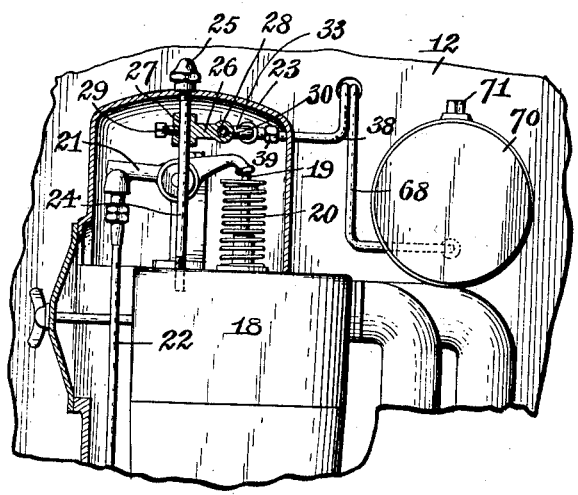
Fig. 3 is an enlarged sectional elevation taken on or about line 3—3, Fig. 2, the valve enclosing casing and certain adjoining parts being shown in section, also a portion of the oiling device.

Reference being had to the drawings in detail, 10 designates the chassis of the automobile, 11 the radiator, 12 the dashboard, 13 the footboard, 14 the floor, and 15 the instrument board of the automobile.

Extending from the dashboard 12 to the instrument board is the cowl 16, which covers the space between the two. 17 is the usual hood covering the space between the dashboard and the radiator and in which the engine 18 is located.

The engine shown in the drawings is one known as having overhead valves, and 19 designates the valve stems of said valves, which are held in their uppermost positions by springs 20 in the usual manner, so as to keep the valves at the inner ends of said stems seated, as will be understood by those skilled in the art to which this invention relates.

21 are the usual rock levers, which are actuated by means of rods 22 caused to reciprocate in any approved manner so as to actuate the rock levers 21 and cause the valve stems 19 to be depressed against the action of the springs 20 and therefore unseat the valves at the inner ends of said stems for admitting the explosive mixture to be ignited, or allowing the exhaust of the burnt gases after explosion of the mixture, as the case may be.

The valve mechanism comprised of the parts just described is usually enclosed within a casing 23 seated against the top of the engine 18, and for the purpose of holding this casing in place, screw rods 24 or the like are invariably threaded into the top of the engine and project through openings in the top of the casing 23, the projecting ends of said screw rods having nuts 25 applied thereto to clamp the casing firmly against the head or top of the engine.

I utilize the screw rods 24 where employed on engines as a means for supporting part of my oiling device, and for this purpose arms 26 are placed on said screw rods so as to extend laterally therefrom, said arms having eyes 27, 28 at opposite ends arranged at right angles to each other, the eyes 27 forming hubs for said arms, which are passed downwardly on said screw rods and fastened in position thereon by means of set screws 29 which bear against the rods and retain the arms in proper position. The eyes 28 of the arms are alined and form supports for a drip pipe 30. Said pipe is of comparatively small diameter and closed at opposite ends by means of plugs 31, or otherwise.

Along the bottom or lowermost region of this pipe, drip openings 32 are formed and the pipe is bent, as at 33, at points where it extends through the eyes 28, the remaining portions of the pipe being in perfect alinement and situated directly over the valve stems of the several valves of the engine. The drip pipe may be held in position on the arms 26 by means of set screws 34, which are passed through the walls of the eyes 28 and bear against the bent portions of the pipe, as clearly shown in Fig. 4.

The drip pipe 30 is formed in two sections 35, 36, said sections being joined at adjacent ends by a T-fitting 37, to which is connected a feed pipe 38 by means of a coupling 39, or otherwise. This feed pipe 38 is led to a pump 40 and connected thereto, as will be explained hereinafter.

The pump 40 comprises a cylinder 41 having a plunger 42 therein, the stem 43 of which extends out through a cap 44 applied to the rear end of the cylinder 41, suitable packing 45 being provided at this point to prevent leakage of oil around the stem of the plunger. The stem 43 has a handle 46 at its rear or inner end for conveniently manipulating the pump.

The cylinder 41 has ears 47 extending from opposite sides thereof by means of which it is fastened to the lower edge of the instrument board 15, suitable screws 48 being used for this purpose. At the forward or outer end of the cylinder 41, a cross member 49 is formed, said cross member having a passage 50 extending therethrough which is in communication with the interior of the cylinder 41 through the medium of a passage 51. Near opposite ends of said cross member 49, forwardly extending bosses 52, 53 are formed which are externally threaded and have clamp nuts 54, 55, respectively, threaded thereon.

The feed pipe 38 has its inner or rear end flanged, as at 56, and this flanged end bears against the end of the boss 52 while the clamp nut 54, when threaded onto said boss, firmly clamps said flange against the end of said boss and makes a tight connection at this point.

Extending through the boss 52 is an oil passage 57, which may be referred to as the outlet passage or port of the pump, formed at what I term the outlet end of the cross member 49. The passage 50 in said cross member is enlarged at its outlet end, as at 58, and the end of said passage is closed by a plug 59. Within the enlarged portion 58 of said passage is a ball valve 60 adapted to seat against the inner end wall 61 of said enlarged portion, said end wall serving as a seat for said valve. Said valve, however, controls the outlet passage or port 57 by reason of the fact that when the ball valve 60 is seated against its seat, oil cannot return from the feed pipe 38 into the pump, nor can oil be delivered from the passage 50 into the outlet passage or port 57 except under pressure exerted by the plunger 42 of the pump.

The cross member 49 is disposed substantially vertical and the outlet passage or port is at its upper end so that the ball valve 60 acts as a gravity valve. At the lower end of said member, or what may be termed the inlet end thereof, an inlet passage 62 is provided, said passage being parallel with the outlet passage 57 and therefore at right angles to the main passage 50. The inner or rear end of said passage 62 is enlarged, as at 63, and the rear end thereof closed by a plug 64. In the enlarged portion 63 of the passage 62 is a ball valve 65 adapted to seat against the end wall of the enlarged portion 63 of said passage, which end wall serves as a seat for the ball and prevents oil from being forced out of the inlet passage 62 under the pressure of the plunger 42 within the cylinder.

It is to be noted that the plugs 59 and 64 have extensions 66, 67, respectively, at their inner ends which serve as stops for the ball valves 60 and 65, respectively.

68 designates a supply pipe, the rear or inner end of which is flared, as at 69, and bears against the end of the boss 53; it being clamped against said end in an oil-tight manner by means of the clamp nut 55 threaded onto said boss. The forward or outer end of said supply pipe is connected to an oil tank 70 which has a filling opening closed by a plug 71, and which can be supplied with oil by removing the plug, access being readily had to said tank by lifting the hood 17 in the usual manner.

By drawing the plunger 42 in the direction of the arrow 72 in Fig. 8, the ball valve 63 in the inlet passage of the pump is drawn from its seat and oil drawn from the tank 70 into the passage 50, and from the latter through the passage 51 into the cylinder 41 of the pump. During this inward or rearward movement of the plunger, the ball valve 60 is drawn firmly against its seat so that oil that may happen to be in the feed pipe 38 or in the drip pipe 30 cannot be drawn back into the pump. When forcing the plunger of the pump forwardly or in the opposite direction from that last described, the ball valve 65 in the inlet passage 62 is forced against its seat and oil within the cylinder or passage 51 and the main passage 50 is forced out through the outlet opening 57 into the feed pipe 38, and from the latter into the drip pipe, the ball valve 60 yielding to pressure under such action so as to provide a free flow of the oil from the passage 50 outwardly to the feed pipe.

By reason of the openings 32 formed on the under side of the drip pipe, one opening above each valve stem, oil is delivered onto the valve stems and assures free action of the parts, it being highly essential that these parts be lubricated at regular intervals; but due to the fact that under present conditions the casing 23 must be removed, oiling of such parts is invariably neglected.

The advantages of this invention will be quite apparent from the description, as it will be apparent that it assures a proper oiling of the valve stems due to the fact that the drip pipe is of comparatively small size and the openings 32 drilled in said pipe of a size that, with each operation of the pump, the necessary quantity of oil will be supplied to the valves.

While the invention is shown applied to a pump for the purpose of oiling the valve stems, it will be quite apparent that other drip pipes may be employed having connection with the feed pipe 38 to lubricate the pivots of the rock levers, or other parts of the engine requiring lubrication.

It is further to be understood that this invention may be used in an aeroplane, or applied to an engine regardless of its particular use.

Having thus described my invention, what I claim is:—

1. The combination with an automobile having an instrument board and an engine provided with overhead valve mechanism, of a pump secured to said instrument board comprising a cylinder, a plunger within said cylinder, a cross member vertically disposed at the front end of said cylinder having a main passage therethrough in communication with the interior of said cylinder, an inlet at the lower end of said main passage, an outwardly closing valve controlling said inlet, an outlet at the upper end of said main passage, an inwardly closing valve controlling said outlet, an oil supply tank spaced from said pump, a pipe connecting said oil supply tank with said inlet, a drip pipe disposed longitudinally over the valve mechanism of said engine, and a pipe connecting said outlet with said drip pipe.

2. The combination with an engine having overhead valve mechanism and posts extending from the upper end of said engine, a casing enclosing said valve mechanism and means co-acting with said posts to retain said casing on said engine, of an arm secured to said posts and extending laterally therefrom and having an eye at its outer end, a drip pipe having an offset portion extending through said eye and two alined portions at opposite sides of said eye provided with drip openings, and means for supplying oil to said drip pipe at will.

In testimony whereof I affix my signature.

DONALD R. CLARK.